United States Patent
Ryu

(10) Patent No.: US 10,701,378 B2
(45) Date of Patent: Jun. 30, 2020

(54) PARALLEL VIDEO PROCESSING APPARATUS USING MULTICORE SYSTEM AND METHOD THEREOF

(71) Applicant: GACHON UNIVERSITY OF INDUSTRY-ACADEMIC COOPERATION FOUNDATION, Seongnam-si (KR)

(72) Inventor: Eun-Seok Ryu, Seoul (KR)

(73) Assignee: GACHON UNIVERSITY OF INDUSTRY—ACADEMIC COOPERATION FOUNDATION (KR)

( * ) Notice: Subject to any disclaimer, the term of this patent is extended or adjusted under 35 U.S.C. 154(b) by 93 days.

(21) Appl. No.: 15/434,771

(22) Filed: Feb. 16, 2017

(65) Prior Publication Data
US 2017/0238000 A1 Aug. 17, 2017

(30) Foreign Application Priority Data
Feb. 16, 2016 (KR) .................. 10-2016-0017988

(51) Int. Cl.
*H04N 7/12* (2006.01)
*H04N 19/436* (2014.01)
(Continued)

(52) U.S. Cl.
CPC ......... *H04N 19/436* (2014.11); *H04N 19/119* (2014.11); *H04N 19/127* (2014.11);
(Continued)

(58) Field of Classification Search
CPC .. H04N 19/436; H04N 19/127; H04N 19/119; H04N 19/14; H04N 19/172; H04N 19/597
(Continued)

(56) References Cited

U.S. PATENT DOCUMENTS

2004/0187126 A1* 9/2004 Yoshimura ............ G06F 9/5038
  718/100
2005/0041031 A1* 2/2005 Diard .................... G06T 15/005
  345/505
(Continued)

FOREIGN PATENT DOCUMENTS

JP 2015011663 A 1/2015

OTHER PUBLICATIONS

Hyunki Baik, et al. 'A complexity-based adaptive tile partitioning algorithm for HEVC decoder parallelization', Image Processing (ICIP). 2015 IEEE International Conference on, (Sep. 27, 2015).
(Continued)

*Primary Examiner* — Richard T Torrente
(74) *Attorney, Agent, or Firm* — Fresh IP PLC; Aubrey Y Chen

(57) ABSTRACT

The present invention generally relates to a parallel video processing apparatus and method for a multicore computing system. According to a specific example of the present invention, since video unit sizes matched to the performance of each core are derived, video units obtained by segmenting an input image screen according to a video codec type are allocated to corresponding cores according to the derived video unit sizes, and then the cores process the allocated video units in parallel, a processing speed differences of each core for the segmented video units may be reduced, and thus the processing speed may be improved, and the power consumption may be reduced.

8 Claims, 14 Drawing Sheets

(51) Int. Cl.
    *H04N 19/14*    (2014.01)
    *H04N 19/119*   (2014.01)
    *H04N 19/172*   (2014.01)
    *H04N 19/127*   (2014.01)
    *H04N 19/597*   (2014.01)
(52) U.S. Cl.
    CPC ........... *H04N 19/14* (2014.11); *H04N 19/172* (2014.11); *H04N 19/597* (2014.11)
(58) Field of Classification Search
    USPC .................................................... 375/240.02
    See application file for complete search history.

(56) References Cited

U.S. PATENT DOCUMENTS

2005/0057571 A1\* 3/2005 Stevens .................... G06F 1/32
                                                    345/501
2008/0293449 A1\* 11/2008 Barlow ................ G06F 1/3203
                                                    455/556.1

OTHER PUBLICATIONS

Korean Office Action dated Mar. 20, 2017.

\* cited by examiner

Fig. 1A
Fig. 1B
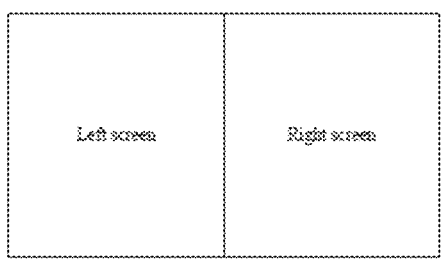
(a) One Picture with Multiple Views
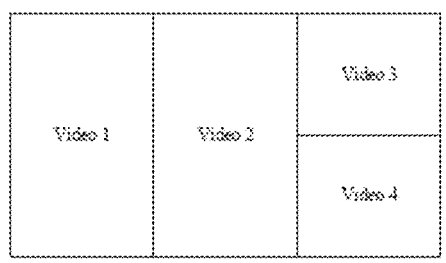
(b) One Picture with Multiple Independent Videos
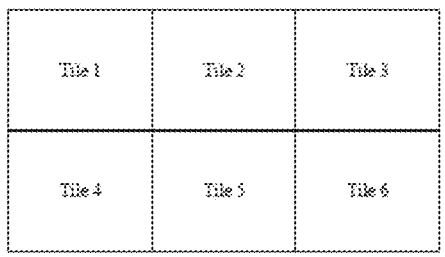
(c) One Picture with Multiple Tiles
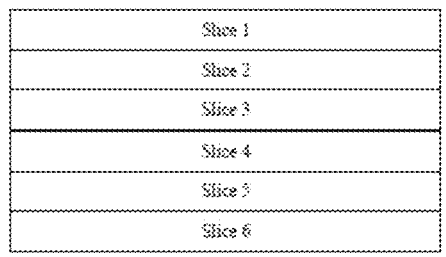
(d) One Picture with Multiple Slices
Fig. 1C
Fig. 1D

UNIFORM SEGMENTATION & REGION OF INTEREST (ROI) PROCESSING

| Loop | Conv. Decoding Time (sec) | Prop. Decoding Time (sec) | Gain (%) |
|---|---|---|---|
| 1 | 63.773 | 42.359 | 33.58 |
| 2 | 63.514 | 42.353 | 33.32 |
| 3 | 63.982 | 42.485 | 33.60 |
| 4 | 63.743 | 42.591 | 33.18 |
| 5 | 63.728 | 42.496 | 33.32 |
| 6 | 63.828 | 42.353 | 33.65 |
| 7 | 63.977 | 42.349 | 33.81 |
| 8 | 63.772 | 42.429 | 33.47 |
| 9 | 63.609 | 42.261 | 33.56 |
| 10 | 64.022 | 42.322 | 33.89 |
| 11 | 63.715 | 42.481 | 33.33 |
| 12 | 63.857 | 42.63 | 33.24 |
| 13 | 63.867 | 42.271 | 33.81 |
| 14 | 63.896 | 42.354 | 33.71 |
| 15 | 63.887 | 42.53 | 33.43 |
| 16 | 64.033 | 42.672 | 33.36 |
| 17 | 63.511 | 42.567 | 32.98 |
| 18 | 63.8 | 42.533 | 33.33 |
| 19 | 63.87 | 42.527 | 33.42 |
| 20 | 63.88 | 42.315 | 33.76 |
| Average | 63.8132 | 42.4439 | 33.49 |

PARALLEL VIDEO PROCESSING APPARATUS USING MULTICORE SYSTEM AND METHOD THEREOF

CROSS-REFERENCE TO RELATED APPLICATION

This application claims priority to Korean Patent Application No. 10-2016-0017988 filed on Feb. 16, 2016 and all the benefits accruing therefrom under 35 U.S.C. § 119, the contents of which are incorporated by reference in their entirety.

BACKGROUND

The present disclosure relates to a parallel video processing apparatus and method for a multicore computing system, and more particularly to, a technology for improving a processing speed of each core and reducing power consumption in a computing system having a plurality of cores by deriving a video unit size to be allocated to each core, in consideration of core performance and computational complexity of a video unit to be processed, and segmenting and allocating an input image screen to corresponding cores according to the derived video unit size.

As the requirements of low power consumption and high performance of CE devices have recently increased, the necessity of a multicore system is increasing. Such a multicore system includes a symmetric multi-processing (SMP) system having a plurality of identical cores and an asymmetric multi-processing (AMP) system having various heterogeneous cores that may be used as a general purpose processor (GPP) such as a digital signal processor (DSP), a graphic processing unit (GPU), or the like.

In order to improve performance by in parallel executing software, which processes a large amount of data, in multiple cores, entire data to be processed is segmented and the segmented data are allocated to respective cores so that the data are processed by the respective cores.

For example, in the case where data to be processed is video data, as illustrated in FIG. 1, the video data is segmented by various video units of a single image screen, and then threads for processing the segmented video data are allocated to respective cores so as to be processed.

FIGS. 1A to 1D exemplarily illustrate a variety of typical video units. Video data is processed in parallel by using a tile technique in the case where left and right images are processed in a head-mounted display (HMD) as illustrated in FIG. 1A, or in the case where independent images which are grouped to form a single screen are processed as illustrated in FIG. 1B, or in the case where a single screen is segmented into a plurality of tiles so as to be processed individually as illustrated in FIG. 1C.

Meanwhile, in the case where a screen including a plurality of slices is processed as illustrated in FIG. 1D, video data is processed in parallel by using a wavefront technique, wherein different numbers of slices are allocated to cores.

However, in the case of a computing system having an asymmetric multicore structure, it is difficult to predict an execution time of a video unit for each core due to different performance and computational characteristics of the cores, and thus it is difficult to efficiently allocate threads for processing video units to asymmetric multiple cores.

Accordingly, the present invention proposes a method for efficiently allocating video units to respective cores in consideration of a processing speed of video data and power consumption, by segmenting the single image screen into video units having locations and sizes according to asymmetric performance of cores and allocating the video units to cores matched to segmented video unit sizes.

SUMMARY

The present disclosure provides a parallel video processing and method for a multicore computing system having a plurality of cores, the apparatus and method being capable of improving a processing speed of each core and reducing power consumption by deriving, in consideration of core performance and computational complexity for each video unit of an input image screen, a video unit size processable in each core, segmenting the input image screen according to the derived video unit size, and then allocating segmented video units to corresponding cores.

In accordance with an exemplary embodiment of the present invention, a parallel video processing apparatus for a multicore computing system includes: a core performance measuring processor including a core performance measuring unit configured to measure performances of a plurality of cores at a predetermined period; a video analysis processor including a video unit computational complexity deriving unit configured to derive a video unit computational complexity according to a resolution of an input image; and a video processing processor configured to match a video unit of a size set according to an image resolution in the video analysis processor to a corresponding core performance of the core performance measuring processor to allocate the video unit.

Preferably, the core performance measuring processor may further include a core performance updating unit configured to measure and update a performance of an available core according to a video processing state of at least one slice allocated to a corresponding core, and then transfer the measured performance to the video processing processor.

Preferably, the video analysis processor may further include a content computational complexity deriving unit configured to derive, in real time, a computational complexity for each input content.

Preferably, the video analysis processor may be provided to derive a computational complexity for each video unit on the basis of a computational complexity model for each video unit through regression analysis on the performance of each core and the resolution of an input image screen, and the video processing processor may be provided to derive video unit sizes to be allocated to respective cores on the basis of a predetermined correlation equation between the video unit computational complexity derived by the video analysis processor and a performance ratio of the respective cores.

Preferably, when an input image screen includes at least one of a video, an audio, or a text, the video processing processor may be provided to segment an input image screen for each video, each audio, and each text, and then allocate segmented input image screens to corresponding cores so that the segmented input image screens are processed in parallel, and, in order to perform video unit encoding, the video processing processor may be provided to segment a video unit provided from the video analysis processor to match a core performance of the core performance measuring processor, and transfer segmented video units to an encoder.

Preferably, in order to perform video unit decoding, the video processing processor may be provided to map, according to a core performance and availability of the core performance measuring processor, a video unit size set according to a computational complexity in the video analysis processor, and transfer the video unit size to a decoder, and the video processing processor may be provided to set at least one of each core performance or a complexity for each video unit size as table values, and allocate, on the basis of the set table values, a video unit of the video analysis processor matched to a corresponding core performance.

In accordance with another exemplary embodiment of the present invention, a parallel video processing method for a multicore computing system includes the steps of: (a) measuring, by a core performance measuring processor, a performance of each core to transfer the measured performance to a video processing processor at a predetermined period; (b) obtaining a resolution of an input image screen to transfer the obtained resolution to the video processing processor; and (c) deriving, by the video processing processor, a video unit size processable by each core on the basis of the performance of each core and the resolution of the input image screen, segmenting the input image screen on the basis of the derived video unit size, and allocating segmented video units to corresponding cores to process the segmented video units in parallel.

Preferably, in step (c), a computational complexity for each video unit may be derived on the basis of regression analysis on the performance of each core and the resolution of an input image screen, and video unit sizes to be allocated to respective cores may be derived on the basis of a predetermined correlation equation between the derived video unit computational complexity and a performance ratio of the respective cores.

Preferably, in step (c), when the input image screen includes at least one of a video, an audio, or a text, the input image screen may be segmented for each video, each audio, and each text, and then segmented input image screens may be allocated to corresponding cores so as to be processed in parallel.

Preferably, in step (c), in order to perform video unit encoding, a video unit provided from a video analysis processor may be segmented to match a core performance of the core performance measuring processor, and segmented video units may be provided to an encoder.

Preferably, in step (c), a video unit size set according to a computational complexity in a video analysis processor may be mapped according to a core performance and availability of the core performance measuring processor so as to perform decoding.

Preferably, in step (c), at least one of each core performance or a complexity for each video unit size may be set as table values, and a video unit of a video analysis processor matched to a corresponding core performance may be allocated on the basis of the set table values.

BRIEF DESCRIPTION OF THE DRAWINGS

Exemplary embodiments can be understood in more detail from the following description taken in conjunction with the accompanying drawings, in which:

FIGS. 1A to 1D are diagrams exemplarily illustrating states in which a typical input screen is segmented according to a video codec;

DETAILED DESCRIPTION OF EMBODIMENTS

Figure 2:
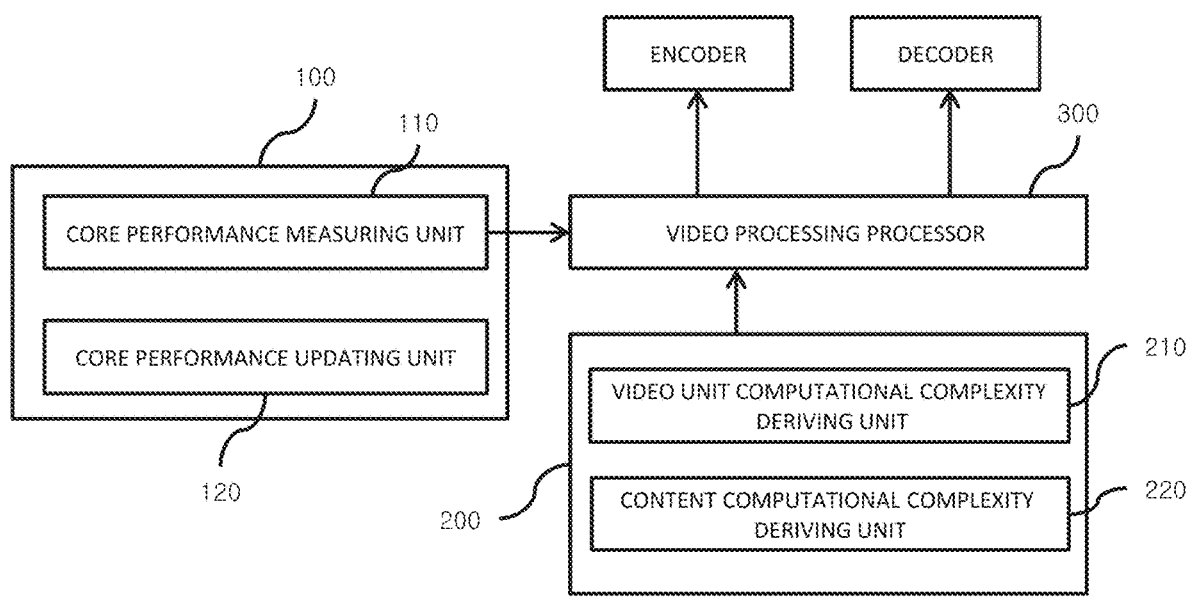
FIG. 2 is a diagram illustrating a configuration of a parallel video processing apparatus for a multicore computing system according to an embodiment of the present invention.

The accompanying drawings illustrating preferred embodiments of the present invention and the contents of the drawings should be referred to in order to sufficiently understand the operational advantages of the present invention and the object achieved by carrying out the present invention.

Hereinafter, preferred embodiments of the present invention will be described in detail with reference to the accompanying drawings. Like reference numerals refer to like elements throughout.

Specific structures or functional descriptions provided in relation to embodiments of the present invention are only intended to describe embodiments according to the concept of the present invention. Thus, embodiments according to the concept of the present invention may be implemented in various forms. Furthermore, it should be understood that the present invention is not limited to embodiments described herein, but includes any modifications, equivalents, or alternatives falling within the concept and the technical scope of the present invention.

The terms "first", "second", and the like used herein may be used for describing various elements, but the elements are not limited by the terms. The terms are used only for distinguishing one element from other elements, and, for example, without departing the scope of right of the present invention, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly contacted" to another element, there are no intervening elements present. Other terms for describing relationships among elements, such as "between", "directly between", "adjacent to", "directly adjacent to", and the like should be interpreted in the same manner.

The terminology used herein is not for delimiting the present invention but for describing specific embodiments. The terms of a singular form may include plural forms unless otherwise specified. It will be further understood that the terms "comprise", "comprising,", "include", "including", "have" or "having", when used herein, specify the presence of stated features, numbers, steps, operations, elements, components or combinations thereof, but do not preclude the presence or addition of one or more other features, numbers, steps, operations, elements, components or combinations thereof.

FIG. 2 is a diagram illustrating a configuration of a parallel video processing apparatus for a multicore computing system according to an embodiment of the present invention. Referring to FIG. 2, the parallel video processing apparatus for the multicore computing system according to the embodiment of the present invention is provided to derive a video unit size processable in each core according to asymmetric performance of each core and computational complexity of each video unit of an input image screen, and allocate video units segmented according to the derived video unit size to respective cores so that the video units are processed in parallel. The apparatus may include a core performance measuring processor 100, a video analysis processor 200, and a video processing processor 300.

The core performance measuring processor 100, which serves to measure performance and availability of each core of the computing system at a predetermined period and transfer the measured performance and availability to the video processing processor 300, includes a core performance measuring unit 110 and a core performance updating unit 120.

The core performance measuring unit 110 may measure the performance and the availability of each core at a predetermined period, and the core performance updating unit 120 may update the performance and the availability of a corresponding core according to a video processing state of at least one slice allocated to the corresponding core.

The video analysis processor 200 may be provided to obtain computational complexity in real time according to resolution of an input image screen and transfer the computational complexity to the video processing processor 300. The video analysis processor 200 may include a video computational complexity deriving unit 210 for deriving the computational complexity for each input video unit on the basis of a model for the computational complexity of each video unit and a content computational complexity deriving unit 220 for deriving the computational complexity for each input content in real time.

The video processing processor 300 is provided to set a video unit size to be allocated to each core on the basis of the performance of each core and the computational complexity for each video unit, and allocate segmented video units to cores matched to the set video unit sizes so that the video units are processed in parallel.

That is, the video processing processor 300 derives the video unit size to be allocated to each core on the basis of the resolution provided from the video analysis processor 200 and the performance of each core provided from the core performance measuring processor 100.

For example, provided that computational complexity is comp, video unit side is Res, regression coefficient is C, the number of big cores having high core performance is $N_B$, and the number of little cores is $N_L$, the video unit size to be allocated to a first core (big core) is expressed as Equation (1), and the video unit size to be allocated to a second core (little core having lower processing speed compared to the big core) is expressed as Equation (2) as shown below.

Screen size to be allocated to first core:

$$Res_B = \frac{100C1 + NLC2(1 - RatioCompLB)}{C1(NL \times RatioCompLB + NB)} \quad (1)$$

Screen size to be allocated to second core:

$$Res_L = \frac{RatioCompLB(NBC2 + 100C1) - NBC2}{C1(NL \times RatioCompLB + NB)} \quad (2)$$

Here, computational complexity Comp for each video unit obtained by using a computational complexity model for each video unit through regression analysis satisfies following Equation (3), and a performance ratio RatioComp of cores satisfies following Equation (4).

$$Comp = C1 \times Res + C2 \quad (3)$$

$$\text{Performance ratio of cores: } RatioCompLB = \frac{CompL}{CompB} \quad (4)$$

Video units are allocated to corresponding cores matched to the video unit size allocated to the first core and expressed as Equation (1) and the video units size allocated to the second core and expressed as Equation (2), so as to be processed in parallel.

Figure 3:
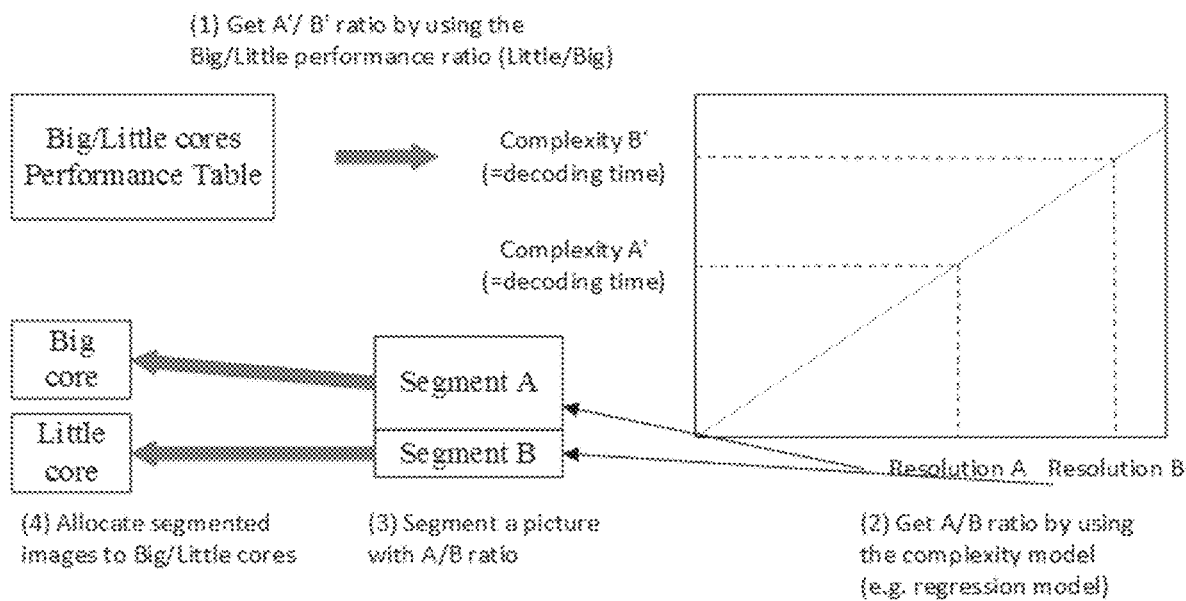
FIG. 3 is a diagram illustrating a state in which video units are allocated for each video unit size according to each core performance in the parallel video processing apparatus for the multicore computing system according to an embodiment of the present invention.
Figure 4:
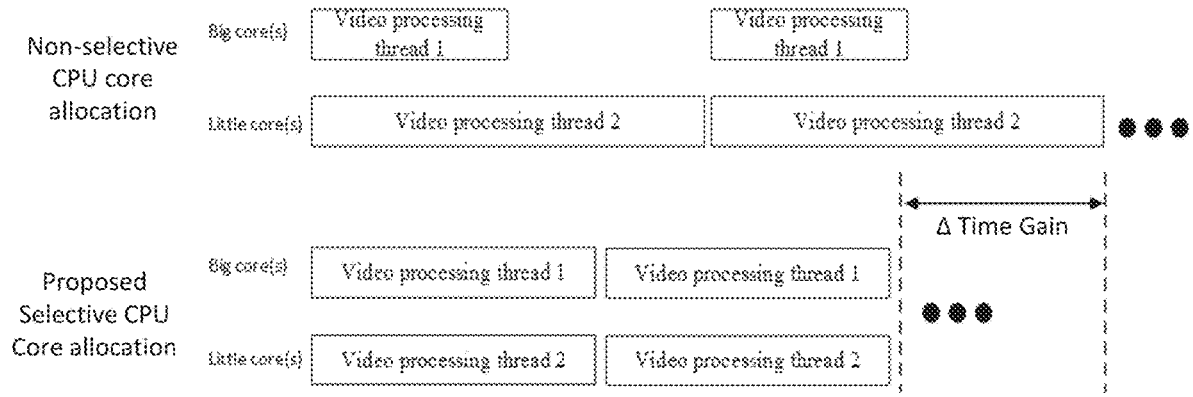
FIG. 4 is a diagram illustrating a state in which segmented video units are processed in parallel in the parallel video processing apparatus for the multicore computing system according to an embodiment of the present invention.

FIG. 3 is a diagram illustrating a state in which video units are allocated to the first core (big core) and the second core (little core) according to the video unit size of a single screen in the video processing processor 300 illustrated in FIG. 2, and FIG. 4 is a diagram illustrating parallel processing of threads for processing allocated video units. As illustrated in FIGS. 3 and 4, the video processing processor 300 allocates, to set cores, video units having video unit sizes derived on the basis of the computational complexity for each video unit and the core performance ratio, and the cores to which the video units are allocated process, in parallel, threads for processing the video units.

In the embodiment of the present invention, in order to encode a video unit, the video processing processor 300 may segment the video unit provided from the video analysis processor 200 to match the core performance of the core performance measuring processor 100, and may provide segmented video units to an encoder.

Furthermore, in the embodiment of the present invention, in order to decode a video unit, the video processing processor 300 may map, according to the core performance and availability of the core performance measuring processor 100, the video unit size set according to the computational complexity in the video analysis processor 200 to perform decoding.

In the embodiment of the present invention, it is described that the video processing processor 300 allocates, according to the core performance and availability of the core performance measuring processor 100, the video unit size set according to the computational complexity in the video analysis processor 200. However, the computational complexity and the core performance obtained by the video analysis processor 200 may be set as table values, and a corresponding video unit matched to a corresponding core may be allocated on the basis of the set table values.

An example in which a single image screen is segmented according to a video codec type and allocated to each core is described below according to each video unit.

Figure 5:
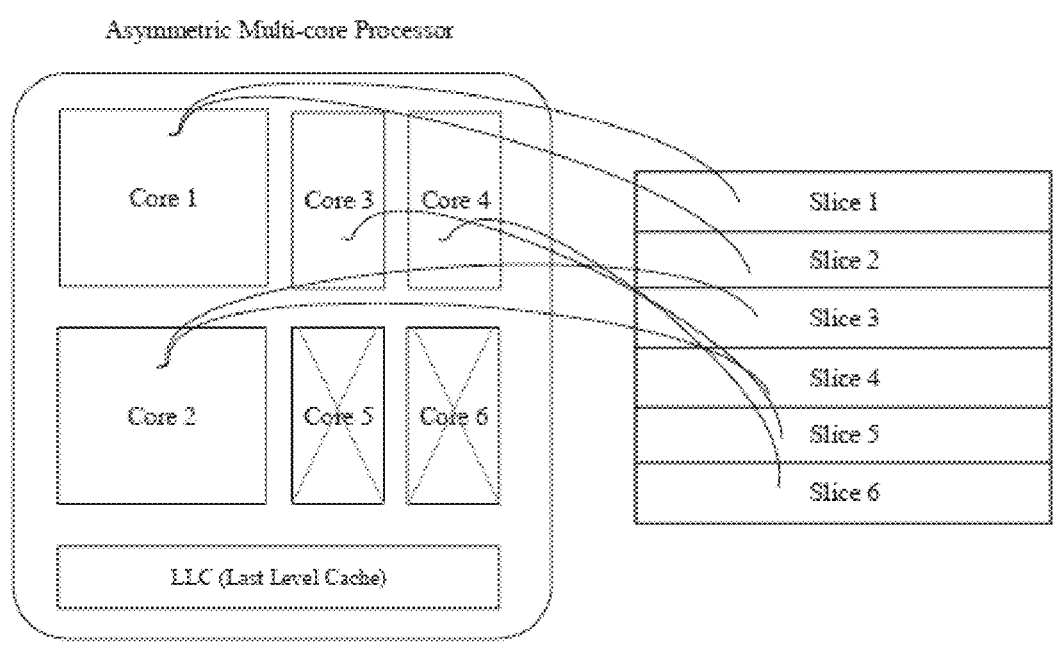
FIGS. 5 to 12 are diagrams exemplarily illustrating video units segmented according to a video unit size depending on each core performance in the parallel video processing apparatus for the multicore computing system according to an embodiment of the present invention.

FIG. 5 is a diagram exemplarily illustrating a state in which video units of at least one slice segmented from a single image screen are allocated to cores set for each video unit size in the video processing processor 300 illustrated in FIG. 2. As illustrated in FIG. 5, each core processes in parallel threads of video units of at least one slice having predetermined video unit sizes. Here, the video unit size of at least one slice allocated to a corresponding core is updated at a predetermined period.

Although it is exemplarily described that one slice is allocated to one core, a plurality of slices may be allocated to one core, or one slice may be allocated to a plurality of cores, according to the video unit size set on the basis of the core performance ratio and the computational complexity of a video unit as described above.

Figure 6:
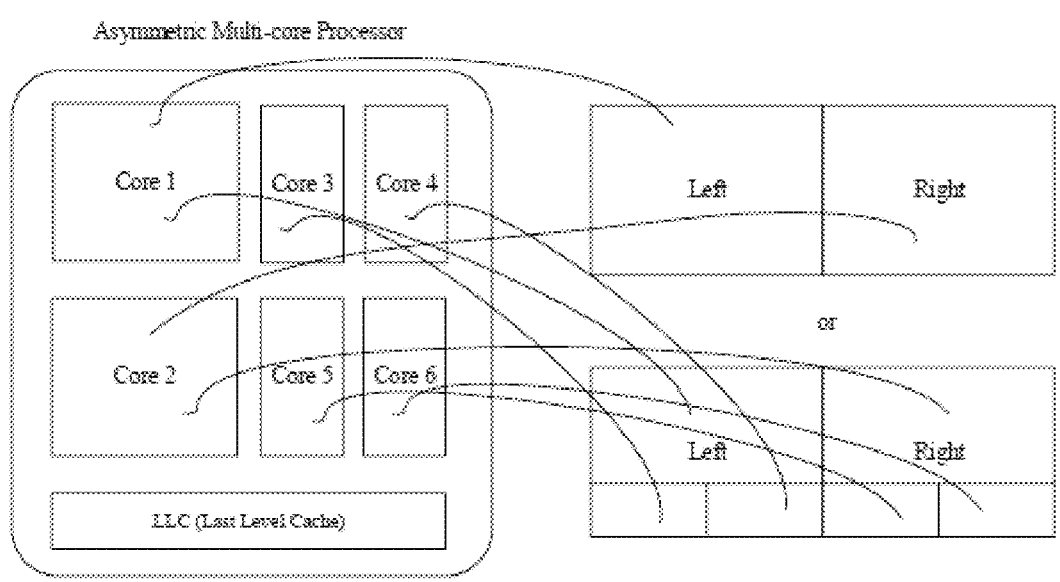

FIG. 6 is a diagram exemplarily illustrating a state in which left and right videos units are allocated to cores set for each video unit size in the video processing processor 300 illustrated in FIG. 2 in the case of using a head-mounted display (HMD) in which left and right screens are required to be processed on a single screen. As illustrated in FIG. 6, the video processing processor 300 allocates the left and right video units to cores, and each core processes in parallel threads for processing the allocated video units. Furthermore, in the case of a three-dimensional multi-view image, computational amounts are not the same between left and right videos, and thus the video processing processor 300 has different complexities. Therefore, the video processing processor 300 allocates left and right video units to cores set for each video unit size, and each core processes in parallel threads for processing the allocated left and right video units.

Figure 7:
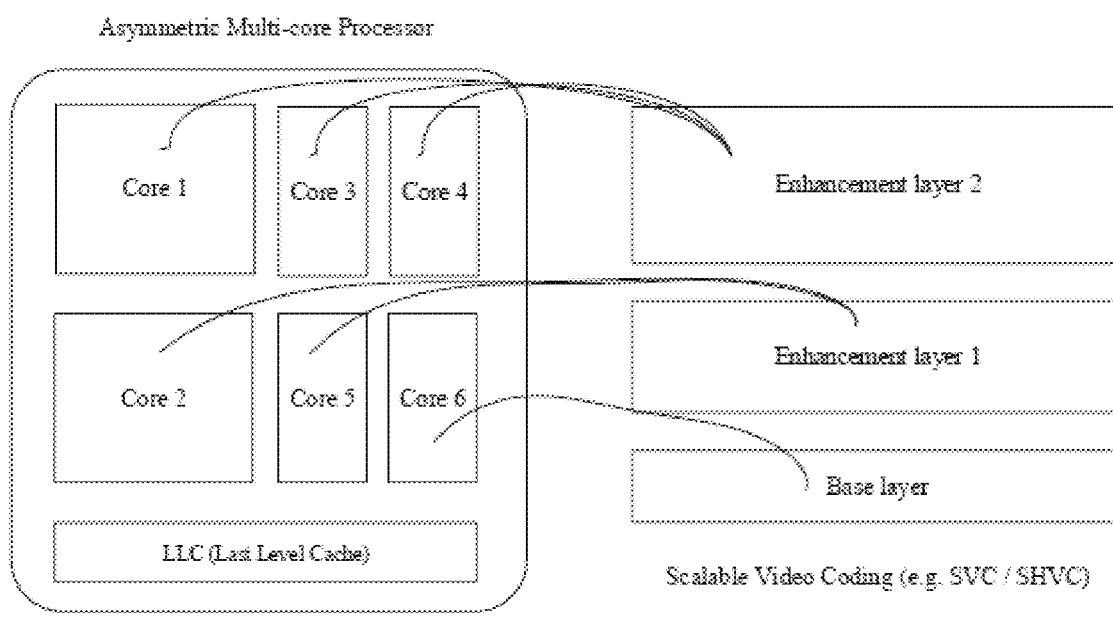

FIG. 7 is a diagram exemplarily illustrating a state in which a scalable video coding unit is allocated to a core in the video processing processor 300 illustrated in FIG. 2 in the case where parallel processing is required to be performed with scalable video coding units in order to process scalable efficiency video coding (SVC) or scalable high efficiency video coding (SHVC) images.

When performing parallel processing with scalable video coding units, a computational amount changes according to the sizes, resolutions, frame rates, or complexities of a base layer and an enhancement layer, and thus the video processing processor 300 allocates a video unit of the base layer to a little core and allocates a video unit of the enhancement layer to a big core as illustrated in FIG. 7.

Figure 8:
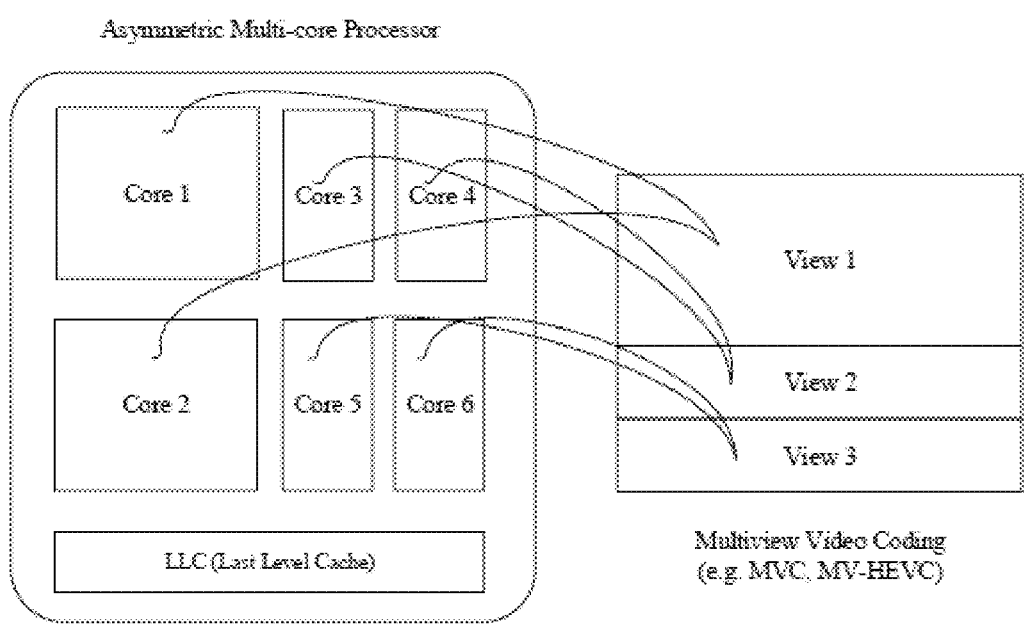

FIG. 8 is a diagram exemplarily illustrating a state in which a video unit is allocated to a core for each view in the video processing processor 300 illustrated in FIG. 2 in the case where parallel processing is required to be performed for each codec in order to code a multi-view video. That is, referring to FIG. 8, for example, a video unit of a first view has a higher computational complexity than computational complexities of video units of a second view and a third view, which follow the video unit of the first view, and thus the video processing processor 300 allocates video units of corresponding views to cores matched to the computational complexities of the video units of the views so as to process in parallel the video units.

Figure 9:
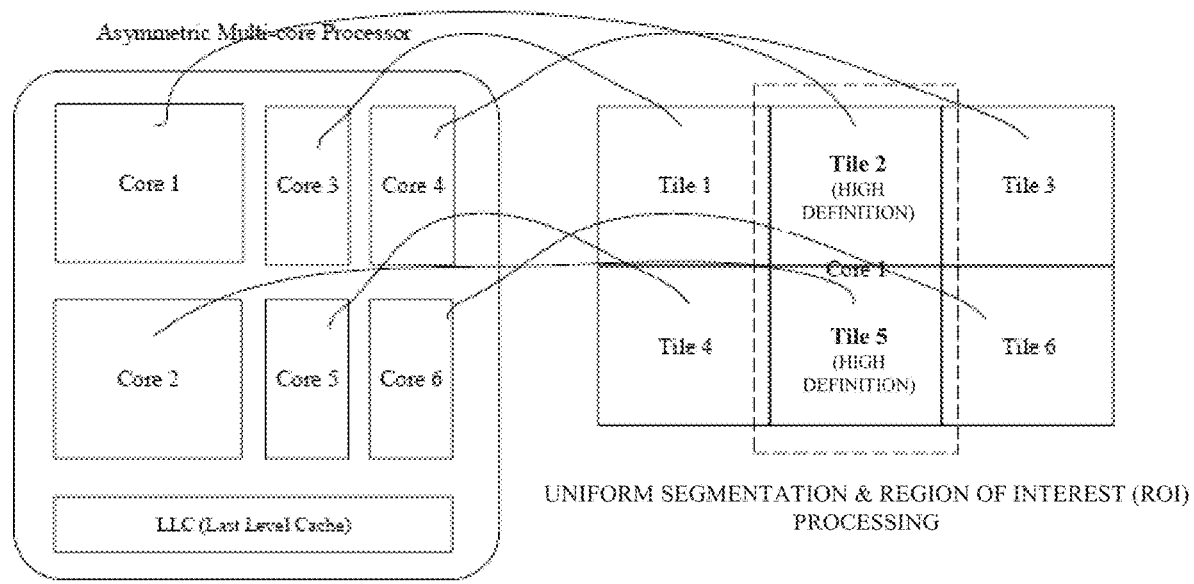

FIG. 9 is a diagram exemplarily illustrating a state in which each tile is allocated to a core in the video processing processor 300 illustrated in FIG. 2 in the case where some high-definition video units amongst tile-type video units having the same video unit size are required to be processed in parallel. Referring to FIG. 9, since the computational complexities of video units of high-definition tiles are high, a big core is required, and thus the video processing processor 300 allocates the video units of the high-definition tiles to the big core, and allocates the video units of the other tiles to a little core so as to process in parallel the video units.

Figure 10:
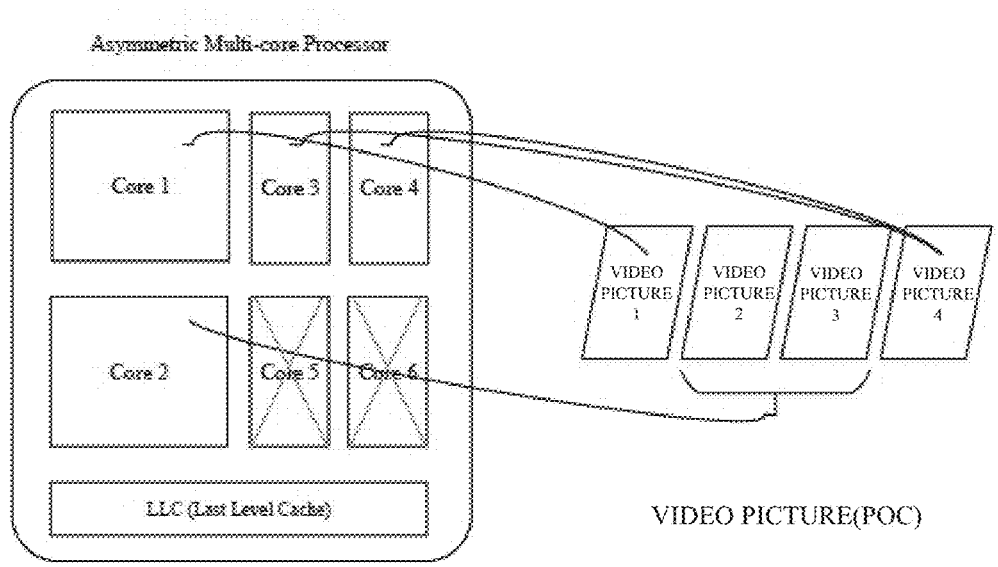

FIG. 10 is a diagram exemplarily illustrating a state in which a core is allocated for each video screen in the video processing processor 300 illustrated in FIG. 2 in the case where a plurality of video screens are required to be processed. Referring to FIG. 10, the video processing processor 300 allocates a video screen having a high computational complexity to a plurality of little cores, allocates a single video screen to a single big core, and allocates a video screen having a low computational complexity to a single little core so as to process in parallel the video screens. That is, the cores are allocated on the basis of core performance and the computational complexities of the video screens.

Figure 11:
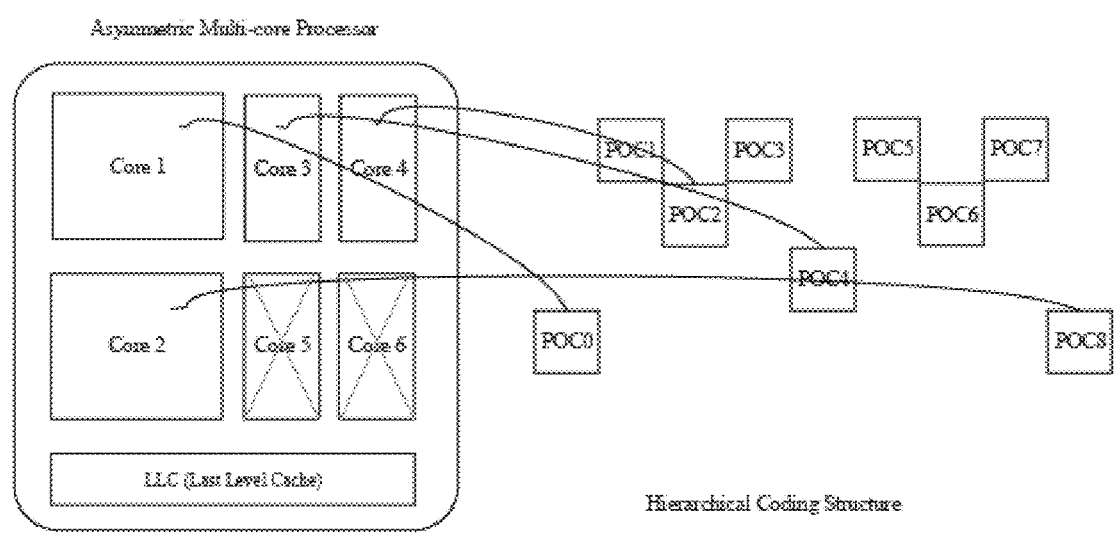

FIG. 11 is a diagram exemplarily illustrating a state in which a video unit of each layer is allocated to a core in the video processing processor 300 illustrated in FIG. 2 in the case where video units of a plurality of layers are required to be processed. Referring to FIG. 11, since temporal layers have different computational complexities of video units, the video processing processor 300 allocates a video unit of a temporal layer having a high computational complexity to a big core, and allocates a video unit of a temporal layer having a low computational complexity to a little core, so as to process the video units in parallel. That is, the cores are allocated on the basis of the core performance and the computational complexities of the video units of the temporal layers.

Figure 12:
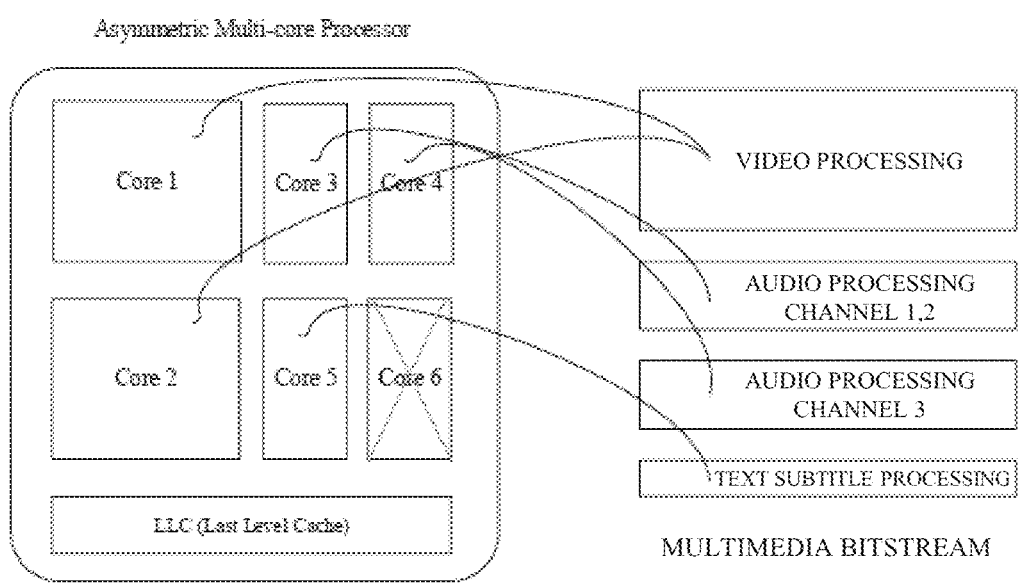

FIG. 12 is a diagram exemplarily illustrating a state in which a core is allocated for each video, each audio, and each text in the video processing processor 300 illustrated in FIG. 2 in the case where an image in which a video, an audio, and a text are combined is required to be processed. Referring to FIG. 12, the video processing processor 300 allocates a video having a high computational complexity to a big core, and allocates an audio and a text having a low computational complexity to a little core so as to process in parallel the video, audio, and text. That is, the cores are allocated for each video, each audio, and each text on the basis of the core performance.

Therefore, since video unit sizes matched to the performance of each core are derived, video units obtained by segmenting an input image screen according to a video codec type are allocated to corresponding cores according to the derived video unit sizes, and then the cores process the allocated video units in parallel, a processing speed differences of each core for the segmented video units may be reduced, and thus the processing speed may be improved, and the power consumption may be reduced.

Although an asymmetric multicore computing system having different core sizes is exemplarily described in relation to the embodiment of the present invention, it would be obvious that the embodiment of the present invention is applicable to a multicore computing system having an identical core size.

Figure 13:
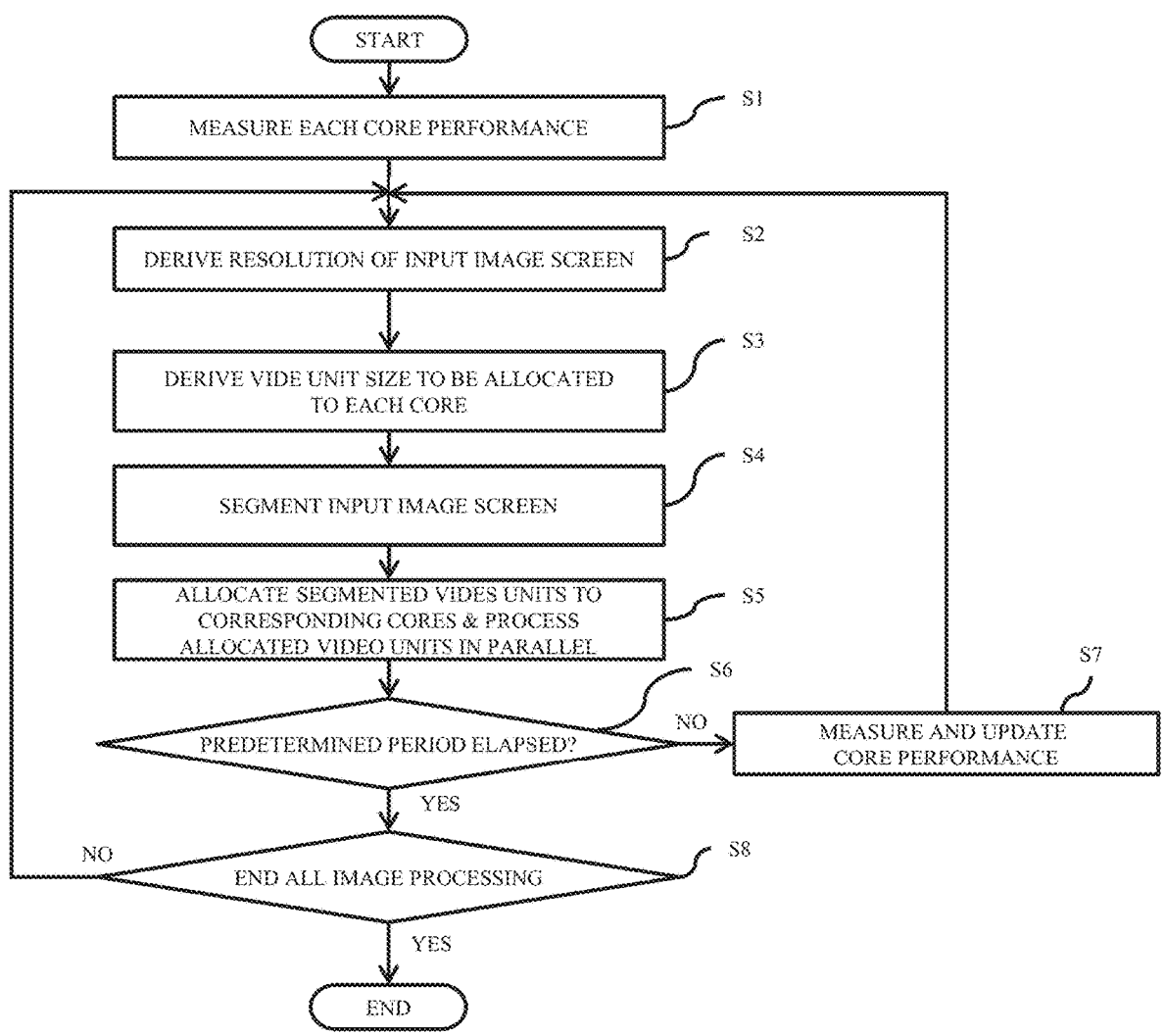
FIG. 13 is a flowchart illustrating a parallel video processing process in a multicore computing system according to an embodiment of the present invention.

Described below with reference to FIG. 13 is a process in which a video units size of an input screen is segmented on the basis of the computational complexity of a video unit of the image screen according to the core performance, and video units are allocated to cores matched to segmented video unit sizes so that the video units are processed in parallel.

FIG. 13 is a flowchart illustrating an operation process of the parallel video processing apparatus for the multicore computing system illustrated in FIG. 2. A parallel video processing process for the multicore computing system according to another embodiment of the present invention will be described with reference to FIG. 13.

The core performance measuring processor 100 measures the performance of each core provided with a computing system, and transfers the measured performance to the video processing processor 300 (S1).

Furthermore, the video analysis processor 200 transfers information generated based on an input image screen to the video processing processor 300.

Here, the video analysis processor 200 measures the computational complexity for each video unit and each content.

Thereafter, the video processing processor 300 derives video unit sizes $Res_B$ $Res_L$ to be respectively allocated to a big core and a little core, on the basis of the performance ratio of a big core and a little core of the core performance measuring processor 100 and at least one of the computational complexity for each content or the computational complexity for each video unit, and segments an input screen input in correspondence to the derived video unit sizes $Res_B$ $Res_L$, and then allocates the segmented video units to corresponding cores so as to process the video units in parallel (S3, S4, S5).

Here, the computational complexity for each video unit or each content is derived through linear regression analysis on the basis of the number of big cores $N_B$, the number of little cores $N_L$, image screen size (resolution), regression coefficient C, and a computational complexity ratio RatioCompLB of a big core and a little core, and the video unit $Res_B$ to be allocated to a big core and the video unit $Res_L$ to be allocated to a little core are derived from the core performance ratio RatioCompLB and the computational complexity of the core performance measuring processor 100.

Thereafter, when a predetermined time (typically set in hours) elapses, the video analysis processor 200 receives the measured performance of an available core from the core performance measuring processor 100, and updates with the measured performance of an available core, and then proceeds to step S2 (S6, S7). The video unit sizes $Res_B$ $Res_L$ to be respectively allocated to updated cores are derived, and an image screen input in correspondence to the derived video unit sizes $Res_B$ $Res_L$ is segmented, and then segmented video units are allocated to corresponding cores so as to be processed in parallel. After completing parallel processing for a single image screen, a next image screen is received, and then the above-described process is repeated.

Thereafter, in the case where a next image screen is not input, the video analysis processor 200 determines that processing of corresponding content is completed, and terminates the program (S8).

According to the present invention, in order to encode a video unit, the video unit provided from the video analysis processor 200 may be segmented so as to match the core performance of the core performance measuring unit 110, and segmented video units may be provided to an encoder.

Furthermore, according to the present invention, in order to decode a video unit, the video unit size set according to the computational complexity in the video analysis processor 200 may be mapped according to the core performance and availability of the core performance measuring processor 100 so as to perform decoding.

Moreover, although it is described that the video unit size set according to the computational complexity in the video analysis processor 200 is allocated according to the core performance and availability of the core performance measuring processor 100, a corresponding video unit may be allocated to a corresponding core set by table values for each video unit size set according to the computational complexity of the video analysis processor 200.

Therefore, since a video unit size is segmented to match the performance ratio of cores, segmented video units are allocated to corresponding cores, and then the cores execute threads for processing the allocated video units, a processing speed differences of each core for the segmented video units may be reduced, and thus the power consumption may be reduced.

That is, in the case of an image screen having a test sequence of high efficiency video coding (HEVC) with resolution of 4K (3840×2160), frame rate of 50.150, and quantization parameter (QP) 22, video unit sizes derived on the basis of the performance ratio of cores and the computational complexity have a ratio of 66:34 between a big core and a little core.

Figures 14A, 14B:
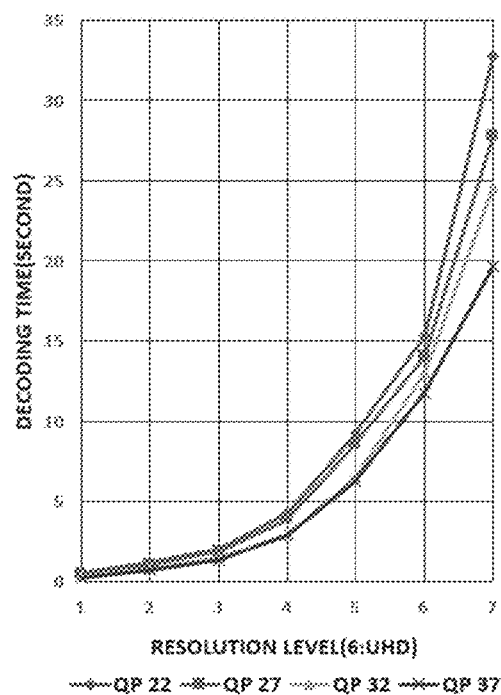
FIGS. 14A and 14B are graphs illustrating video coding speeds depending on resolution according to an embodiment of the present invention.

Video units are processed in parallel by allocating identical video units to identical cores in a control group, and video units are processed in parallel by allocating video units of 66/100 of an entire screen to a big core and allocating video units of 34/100 of the entire screen to a little core in an experimental group. As a result, as illustrated in the table and the graph of FIG. 14, the processing speed of the experimental group is 33% higher than that of the control group.

As described above, according to the parallel video processing apparatus and method for a multicore computing system according to embodiments of the present invention, since video unit sizes matched to the performance of each core are derived, video units obtained by segmenting an input image screen according to a video codec type are allocated to corresponding cores according to the derived video unit sizes, and then the cores process the allocated video units in parallel, a processing speed differences of each core for the segmented video units may be reduced, and thus the processing speed may be improved, and the power consumption may be reduced.

Although the present invention has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A parallel video processing apparatus for a multicore computing system, the parallel video processing apparatus comprising:
   a core performance measuring processor comprising a core performance measuring unit configured to measure a performance and an availability for each of a plurality of cores periodically at a predetermined period, the plurality of cores comprising at least two cores having asymmetric performances with different processing speeds from each other;
   a video analysis processor comprising a video computational complexity deriving unit configured to derive a computational complexity for each video unit based on a computational complexity model for each video unit through regression analysis on the performance of each core and a resolution of an input image screen; and
   a video processing processor configured to derive a video unit size allocated each core based on the performance and the availability for each of a plurality of cores, and to allocate video units to corresponding cores among the plurality of cores to be matched to the video unit size, wherein the video processing processor is configured to derive the video unit size based on a performance ratio of cores with different processing speeds, the computational complexity for each video unit, the number of cores with different processing speeds, and a regression coefficient.

2. The parallel video processing apparatus of claim 1, wherein the core performance measuring processor further comprises a core performance updating unit configured to measure and update a performance of an available core according to a video processing state of at least one slice allocated to a corresponding core, and then transfer the measured performance to the video processing processor.

3. The parallel video processing apparatus of claim 1, wherein the video processing processor is provided to derive the video unit size to be allocated to each core based on a predetermined correlation equation between the video unit computational complexity derived by the video analysis processor,
wherein the video unit is a file type,
wherein a video unit which has a higher video unit computational complexity than other video units is allocated to a core with a higher processing speed than other cores.

4. The parallel video processing apparatus of claim 1, wherein, when an input image screen comprises at least one of a video, an audio, or a text, the video processing processor is provided to segment an input image screen for each video, each audio, and each text, and then allocate segmented input image screens to corresponding cores so that the segmented input image screens are processed in parallel.

5. The parallel video processing apparatus of claim 1, wherein, in order to perform video unit encoding, the video processing processor is provided to segment a video unit provided from the video analysis processor to match a core performance of the core performance measuring processor, and transfer segmented video units to an encoder.

6. The parallel video processing apparatus of claim 1, wherein, in order to perform video unit decoding, the video processing processor is provided to map, according to a core performance and availability of the core performance measuring processor, a video unit size set according to a computational complexity in the video analysis processor, and transfer the video unit size to a decoder.

7. The parallel video processing apparatus of claim 1, wherein the video processing processor is provided to set at least one of each core performance or a complexity for each video unit size as table values, and allocate, on the basis of the set table values, a video unit of the video analysis processor matched to a corresponding core performance.

8. A parallel video processing method for a multicore computing system, the method comprising:
(a) measuring, by a core performance measuring processor, a performance and an availability for each of a plurality of cores periodically at a predetermined period, wherein the plurality of cores comprises at least two cores having asymmetric performances with different processing speeds from each other;
(b) deriving, by a video analysis processor, a computational complexity for each video unit based on a computational complexity model for each video unit through regression analysis on the performance of each core and a resolution of an input image screen; and
(c) deriving, by a video processing processor, a video unit size allocated each core based on the performance and the availability for each of the plurality of cores; and
(d) allocating, by the video processing processor, video units to corresponding cores among the plurality of cores to be matched to the video unit size,
wherein the video unit size is determined based on a performance ratio of cores with different processing speed, the computational complexity for each video unit, the number of cores with different processing speed, and a regression coefficient.

* * * * *